Dec. 22, 1953     C. J. JOHNSON     2,663,462
SEED PLANTER
Filed July 19, 1950
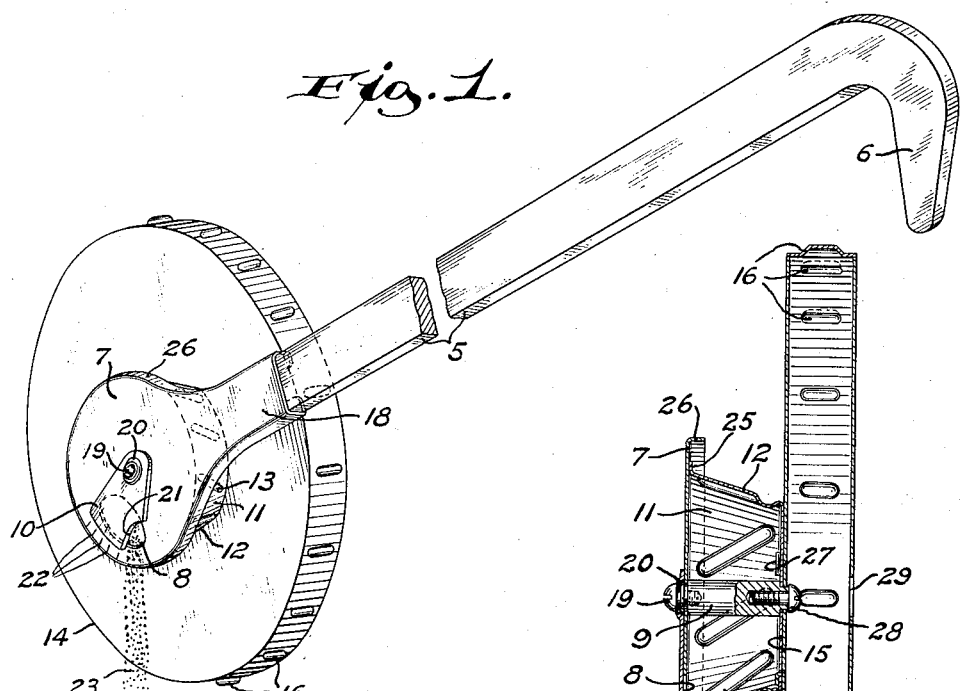
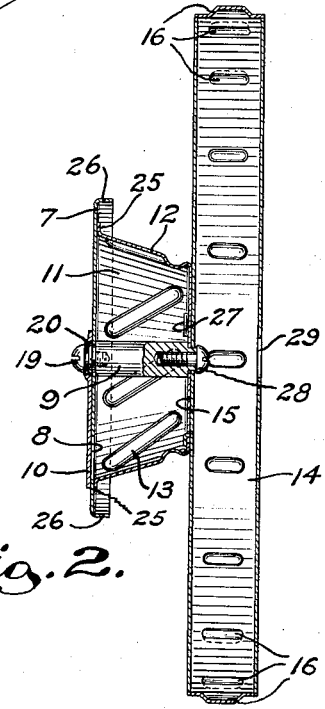
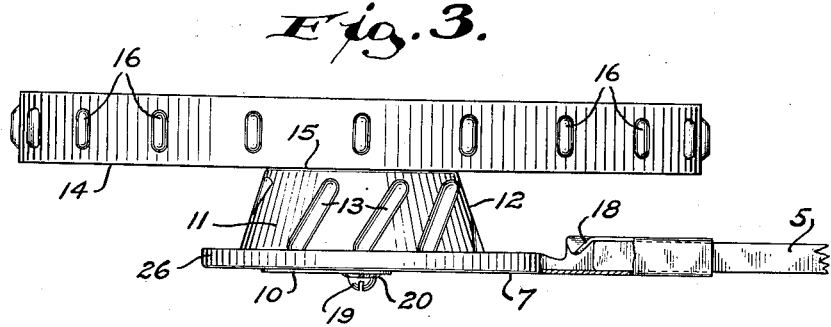
INVENTOR.
Clarence J. Johnson
BY
Lieber & Lieber
ATTORNEYS.

Patented Dec. 22, 1953

2,663,462

UNITED STATES PATENT OFFICE 2,663,462

SEED PLANTER

Clarence J. Johnson, Holmen, Wis., assignor to Outers Laboratories, Inc., Onalaska, Wis., a corporation of Wisconsin Application July 19, 1950, Serial No. 174,759

3 Claims. (Cl. 222—167)

1

This invention relates generally to improvements in the art of sowing seeds in gardens or the like, and relates more specifically to improvements in the construction and operation of mechanical seeders having relatively limited capacity.

The primary object of my present invention is to provide an improved mechanical seeder which is simple and compact in construction, conveniently manipulable, and highly effective and economical in use.

When planting relatively small plots such as vegetable and flower gardens, it is exceedingly desirable to be able to deposit the seeds in regular rows and in predetermined quantities, in order to insure attractive appearance of the final garden and to eliminate excessive waste of seed. While numerous so-called garden seeders have heretofore been proposed and some have been commercialized, most of these prior devices were either too complicated and therefore difficult to manufacture and to manipulate, or they could not be readily adjusted to produce variable performance and to avoid undesirable seed waste. Then too, the prior garden seeding units were cumbersome and relatively costly so that none have become very popular with the trade.

It is therefore an important object of the present invention to provide an improved garden seeding unit which meets all of the above mentioned requirements in a most effective manner and which may be manipulated by a novice to produce excellent results.

Another important object of this invention is to provide a light but durable seeder constructed primarily of sheet metal and at moderate cost with the aid of punches and dies, and which may be quickly and conveniently loaded and adjusted to economize on seed.

A further important object of the invention is to provide a simple but durable seeding device which is operable either by hand or power, and all parts of which may be readily assembled or dismantled for inspection and cleaning.

Still another important object of my invention is to provide an improved portable seeding assemblage which will function to effectively plant various kinds of seeds, and wherein the seeds may be uniformly deposited in neat rows of any desired configuration.

These and other objects and advantages of the invention will be apparent from the following description.

A clear conception of the improved features constituting my present invention and of the construction and operation of a typical garden seeder embodying the same, may be had by referring to the drawing accompanying and forming a part of this specification wherein like reference characters designate the same or similar parts in the various views.

Fig. 1 is a perspective view of one of my improved seeding units showing the same in action;

Fig. 2 is an enlarged central transverse vertical section through the unit of Fig. 1 showing the internal structure thereof; and Fig. 3 is a similarly enlarged fragmentary parts sectional top view of the same seeding unit.

The gist of my present invention is the provision of a light but durable manually controllable seeding unit comprising primarily a guiding handle having at its lower end a disk provided with a seed supply and discharge opening disposed eccentrically of the central disk axis, adjustable means for varying the effective area of the discharge opening, a frustro-conical seed container journalled for rotation about the central axis of the disk and being formed to direct the seed toward the delivery opening, and a ground engaging wheel for rotating the container whenever the wheel is advanced along the ground by the handle. While the improvement has been illustrated and described as having been embodied in an assemblage of small capacity constructed primarily of sheet metal and adapted to be both manually guided and propelled, it is not my desire or intention to thereby unnecessarily restrict the utility of the novel features; and it is also contemplated that specific descriptive terms used herein be given the broadest possible interpretation consistent with the disclosure.

Referring to the drawing, the improved portable garden seeder shown therein, comprises in general an elongated normally inclined handle 5 having a gripping portion 6 at its upper end and a disk 7 fixedly secured to its lower and which disk is provided with a seed supply and discharge opening 8 ordinarily disposed beneath and eccentrically of the central disk axis; a stub shaft or axle 9 permanently secured to the disk centrally thereof and having a feed control plate 10 swingably adjustably associated with its fixed end and cooperating with the seed supply and discharge opening 8 formed in the disk 7; a cup-shaped seed receptacle or container 11 journalled for rotation upon the free end of the fixed stub axle 9 and having a tapered peripheral wall 12 provided with an annular series of helically disposed inward projections 13 for directing the seed toward the seed supply and discharge opening 8; and a ground engaging wheel 14 secured to the container end wall 15 coaxially of the axle 9 and disk 7 and having thereon an annular series of peripheral spuds 16.

The handle 5 may be formed of wood or other light but rigid material, while the disk 7, plate 10, container 11 and wheel 14 are preferably formed of rust resistant sheet metal with the aid of punches and dies, and the stub shaft 9 is made of round metal stock. In order to firmly attach the handle 5 to the upright disk 7, the latter may be provided with an integral socket 18, and the flat feed control plate 10 may be swingably adjustably secured to the axle 9 by a screw 19 and spring washer 20. The plate 10 is also preferably provided with a radial edge 21 which is cooperable with calibrations or indicia 22 on the disk 7 so as to permit convenient and accurate setting of this feed plate 10 in any desired position, and a screw driver may be utilized to effect release and adjustment of the screw 19 so as to facilitate refilling of the container 11 with a fresh supply of seed 23 although normal adjustment of the plate 10 may be made without the aid of tools.

The sheet metal receptacle or container 11 is formed as a cup having its bottom journalled upon the axle shaft 9 and its frustro-conical wall 12 provided with an integral annular brim flange 25 snugly but slidably coacting with the inner face of the disk 7. The periphery of the disk 7 may also be provided with an integral flange 26 overlapping the container flange 25, and the feed projections 13 are punched out of the sheet metal which forms the tapered wall 12 of the cup. The bottom or end wall 15 of the container 11 may be secured to the adjacent side wall of the wheel 14 by means of cleats 27, and a second screw 28 which is accessible through an opening 29 in the opposite wall of the sheet metal wheel 14 serves to hold the seed container 11 and the wheel 14 upon the free end of the stub axle 9.

When the improved seeder unit has been properly constructed and assembled as above described, the receptacle or container 11 should be supplied with a batch of seed 23 through the supply and discharge opening 8 whereupon the feed plate 10 should be set so that its edge 21 will be alined with the marking or indicia 22 corresponding to the type or kind of seed to be sowed. The unit may then be set upon the ground with the handle 5 inclined and the disk 7 disposed approximately upright as shown in Fig. 1, whereupon the handle grip 6 may be utilized to advance the wheel 14 along a furrow or other marker for the rows of seeds. During such advancement of the unit, the tapered container wall 12 will cooperate with the revolving series of helical projections 13 to feed the seed 23 toward the supply and discharge opening 8 of the disk 7, and depending upon the setting of the plate 10, more or less seed 23 will dribble through the opening 8 and will be uniformly deposited in a row upon the ground or into the furrow.

In order to gain access to the interior of the container 11 for inspection or cleaning, it is only necessary to release the single screw 28 through the opening 29 thereby permitting free removal of the wheel 14 and container cup. Reassembly of the unit may be just as quickly effected, and the screw 19 may also be manipulated in order to increase or decrease the friction between the plate 10 and the outside of the flat disk 7. The cup flange 25 snugly coacts with the inner face of the flat disk 7 so as to prevent escape of seeds 23 at the joint, and the flange 26 on the disk 7 not only stiffens this disk but also protects the sliding seal afforded by the container flange 25 coacting with the disk 7. The wheel 14 of the seeding unit may be guided by the handle 5 to follow either straight or curved furrows or paths and the functioning of the device is plainly visible to the operator.

From the foregoing detailed description of the construction and operation of the typical unit, it will be apparent that I have in fact provided an improved seeder which is simple and durable in construction and highly efficient in operation especially for sowing garden plots or the like with seed having varying characteristics. The improved seeding units may be manufactured of sheet metal with the aid of punches and dies at relatively low cost, in various sizes if desired, and the few sturdy parts can be readily assembled or dismantled for inspection and cleaning. The feed regulating plate 10 may be quickly adjusted to insure accurate performance and to permit fresh seed 23 to be inserted within the container 11, and is effectively held in various positions of adjustment by friction. The frustro-conical shape of the container 11 and the helical projections 13 cause the mass of seeds 23 to be constantly agitated and uniformly fed toward the supply and discharge opening 8 of the disk 7, and the flanges 25, 26 provide an effective and well protected seal for preventing undesirable escape of seeds. While the wheel 14 is preferably formed of sheet metal, any other suitable rotary disc-like support may be substituted therefor, and the invention has proven highly satisfactory and successful in actual use.

It should be understood that it is not desired to limit this invention to the exact details of construction and operation of the typical seeding unit herein specifically shown and described, for various modifications within the scope of the appended claims may occur to persons skilled in the art.

I claim:

1. In a seed planter, a propelling and guiding handle having an approximately upright annular disk fixedly secured to its lower end and provided with a rigid central axle extending away from one side, said disk also being provided with a seed supply and discharge opening below said axle, a feed regulating plate adjustably suspended from said axle and coacting with said opening, a rotary frustro-conical seed container surrounding said axle and having its larger end sealingly engageable with said disk and its opposite smaller end journalled on the end of said axle remote from the disk, the frustro-conical bounding wall of said container being tapered to direct the seed toward said discharge opening as the container revolves and said regulating plate being removable from said opening to effect admission of a fresh supply of seed to said container, and a ground engaging wheel secured to the smaller end of said container and also being journalled for rotation upon said remote axle end.

2. In a seed planter, a propelling and guiding handle having an approximately upright annular sheet-metal disk fixedly secured to its lower end and provided with a rigid central axle extending away from one side, said disk also being provided with a seed supply and discharge opening below said axle, a sheet-metal feed regulating plate adjustably suspended from said axle and coacting with said opening, a rotary frustro-conical sheet-metal seed container surrounding said axle and having its larger end sealingly engageable with said disk and its opposite smaller end journalled on the end of said axle remote from the disk, the frustro-conical bounding wall of said container being tapered to direct the seed toward said discharge opening as the container revolves and said regulating plate being removable from said opening to effect admission of a fresh supply of seed to said container, and a sheet-metal ground engaging wheel secured to the smaller end of said container and also being journalled for rotation upon said remote axle end.

3. In a seed planter, a propelling and guiding handle having an approximately upright annular disk fixedly secured to its lower end and provided with a rigid central axle extending away from one side, said disk also being provided with a seed supply and discharge opening below said axle, a feed regulating plate adjustably suspended from said axle and coacting with said opening, a rotary frustro-conical seed container surrounding said axle and having its larger end sealingly engageable with said disk and its opposite smaller end journalled on the end of said axle remote from the disk, the frustro-conical bounding wall of said container having thereon an annular series of integral inwardly extending helical projections and being tapered to direct the seed along said projections toward said discharge opening as the container revolves, and a ground engaging wheel rigidly secured to the smaller end of said container and also being journalled for rotation upon said remote axle end.

CLARENCE J. JOHNSON.

References Cited in the file of this patent

UNITED STATES PATENTS

| Number | Name | Date |
|---|---|---|
| 426,993 | Goldsmith | Apr. 29, 1890 |
| 1,474,184 | Warren | Nov. 13, 1923 |
| 2,204,245 | Bower | June 11, 1940 |

FOREIGN PATENTS

| Number | Country | Date |
|---|---|---|
| 585,612 | Great Britain | Feb. 13, 1947 |